United States Patent [19]

Dziuba et al.

[11] Patent Number: 4,718,686
[45] Date of Patent: Jan. 12, 1988

[54] STEERING ARRANGEMENT FOR MOTOR VEHICLES

[75] Inventors: Peter Dziuba, Überlingen; Rauter Jürgen, Friedrichshafen; Günter Fusseder, Schw.-Gmünd, all of Fed. Rep. of Germany

[73] Assignee: Zahnradfabrik Friedrichshafen AG, Friedrichshafen, Fed. Rep. of Germany

[21] Appl. No.: 878,968
[22] PCT Filed: Oct. 21, 1985
[86] PCT No.: PCT/EP85/00550
§ 371 Date: Jun. 3, 1986
§ 102(e) Date: Jun. 3, 1986
[87] PCT Pub. No.: WO86/02611
PCT Pub. Date: May 9, 1986

[30] Foreign Application Priority Data

Oct. 24, 1984 [LU] Luxembourg ...... PCT/EP84/00331

[51] Int. Cl.⁴ .............................................. B62D 7/06
[52] U.S. Cl. ............................ 280/95 R; 180/155
[58] Field of Search ............... 280/95 R, 111, 95 A; 180/155, 159, 162

[56] References Cited

U.S. PATENT DOCUMENTS

| | | | |
|---|---|---|---|
| 1,775,176 | 9/1930 | Stokes | 180/155 |
| 3,008,743 | 11/1961 | Westercamp | 280/95 R |
| 3,028,172 | 4/1962 | Herbenar | 280/95 R |
| 3,887,211 | 6/1975 | Mazur | 280/95 R |
| 4,403,671 | 9/1983 | Schmahl | 280/111 |
| 4,536,003 | 8/1985 | Maurer et al. | 280/95 R |

FOREIGN PATENT DOCUMENTS 1630616 7/1971 Fed. Rep. of Germany .
3209057 9/1983 Fed. Rep. of Germany .

Primary Examiner—John J. Love
Assistant Examiner—Karin Ferriter
Attorney, Agent, or Firm—Karl F. Ross; Herbert Dubno

[57] ABSTRACT

The steering arrangement utilizes an actuator (5) supported between two steering arm bearings (16) on the corresponding wheel hub drive housing (17) or wheel hub with its piston rods capable of moving outwards on both sides in a longitudinally stiff mode. The actuator (5) is thereby connected to one side of the axle housing (2) approximately where the tapering of the axle housing (2) has occurred, by means of a connecting linkage (4) which affords angular mobility limited on all sides.

Upon changes of the piston rods (15), the actuator rotates about the boss (8) placed on axle housing (2), as well as about a pivot point (10) laterally offset and standing at right angles thereto, so that under strictly rotary motion there results an approach of the acutator (5) to the axle housing (2) which is small at extreme steering angle excursions. The actuator (5) and the steering lever (16) protrude only very little from the axle housing (2) and can be combined with the axle without interfering with the pivot bearing (6), without requiring that a disadvantage with respect to steering angle (21) has to be accepted.

6 Claims, 7 Drawing Figures

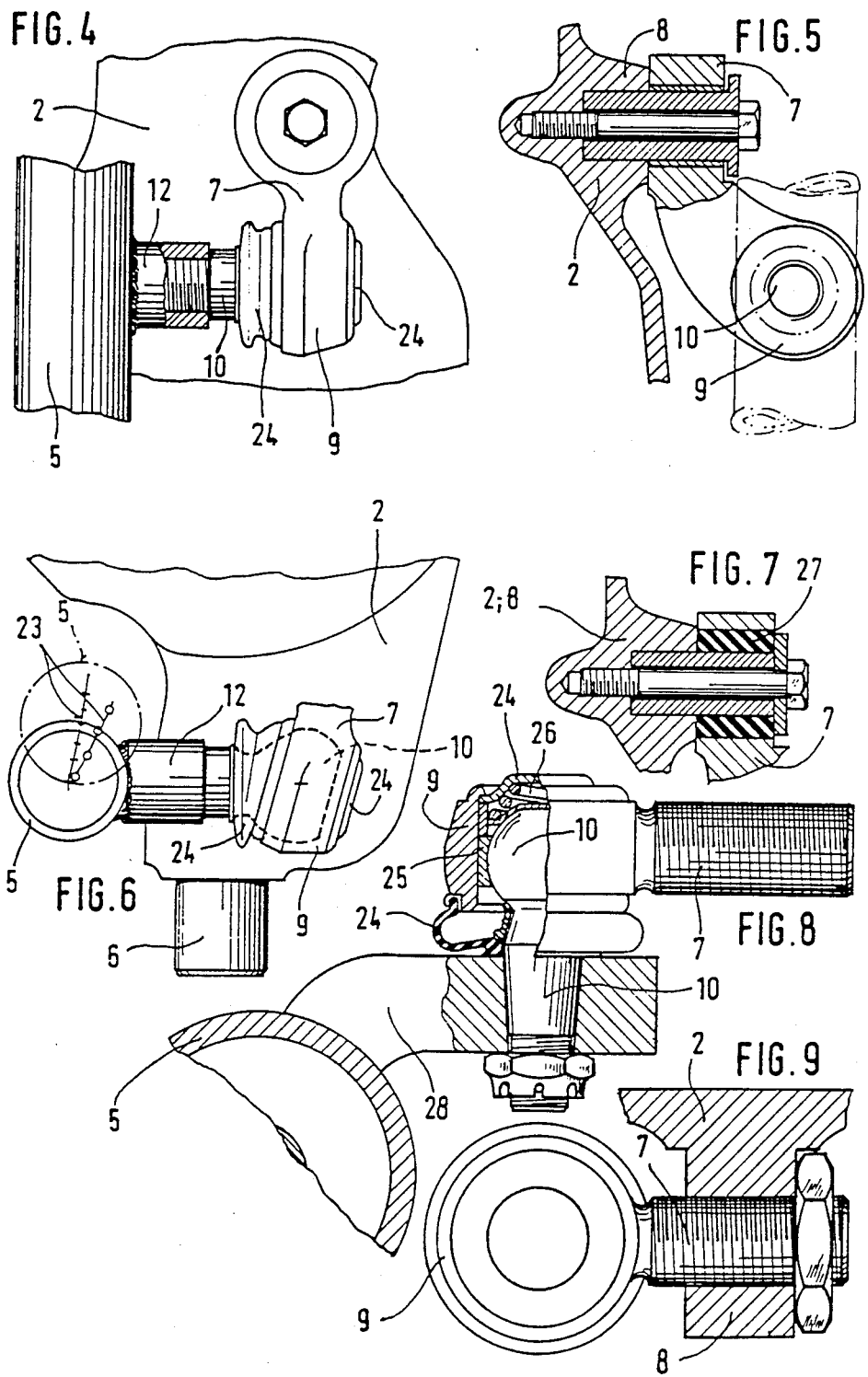

STEERING ARRANGEMENT FOR MOTOR VEHICLES

FIELD OF THE INVENTION

The invention is concerned with a steering arrangement, particularly for narrow-gage motor vehicles.

BACKGROUND OF THE INVENTION

In the construction described by DE-A No. 16 30 616, directed towards economies of manufacture and shock damping, a piston rod of an actuator represents a tie-rod having longitudinal rigidity, and this can be combined with the usual tie-rod ends and toe-in adjustments. Thereby, the actuator itself, in its central portion, is held in or upon a linkage connection which, swiveling about the longitudinal central axis of the vehicle, is guided on a receptacle fastened to the front axle pillow block or an adjacent fixed element, translatably in the longitudinal direction as well as pivoting about a vertical axis. The linkage connection should thereby exhibit a slot-shaped guide which in turn is guided horizontally in a fork-shaped projection of the front axle slidably in a straight line, in that the fork-shaped projection exhibits a pin engaging the slot in the guide at right angles. A preferred embodiment of this arrangement involves two collinear fork-shaped protrusions and two pins engaging the latter which are fastened to the envelope of the actuator. Due to the straight-line guidance provided, a non-central arrangement of the linkage is precluded, because the actuating piston describes a curved path with respect to the axle housing.

When utilized as a pivoting axis, this known construction with straight-line guidance and central arrangement is particularly suited for narrow-gage or compact vehicles. The foregoing is limited, however only to constructions where the linkage connection in the middle of the actuator to the axle body or any other stationary point does not interfere spatially with the suspension of the axle in the vehicle frame, or that its accessibility is seriously reduced. In order to avoid this, the linkage connection must jut out relatively far. Otherwise one has to put up with corresponding large spaces between the axle and the actuator and corresponding widely cantilevered steering.

With increasing distance from the axle body and increasing protrusion of the steering levers, however, there increases the necessary longitudinal translatability of the pins, the danger of damage, the obstacles to space utilization and also the stress on the linkage connection elements, steering levers etc. In addition, there is the danger, which must not be underestimated, in the case of all-terrain vehicles, e.g. tractors, of dirt accumulation and damage caused by rocks and other obstacles along the way due to the extensively cantilevered fork construction with slot-shaped guidance. Rapidly occurring wear of the linkage can therefore soon lead to strong impacts, loud clatter and unsteady stability of steering, or even to rupture of the steering.

It is therefore an object of this invention to obtain a more compact, more robust and more reliable steering arrangement, in particular for the pivoting suspension of driven axles for narrow-gage vehicles.

SUMMARY OF THE INVENTION

By the selection of a linkage connection suitable for curved-path motion of the actuator, and its attachment on one of the ends of the actuator, rather than in the middle as linkages operating in a straight line, so much space is gained with respect to the pivot bearing or the axle that actuator and axle can be arranged much closer to each other via their specially shaped connecting lever which exhibits limited but angularly universally movable articulation. Thereby also only very short steering levers are needed and the construction becomes even more compact. Due to the short distance the relative motions of the linkage elements are minimized. Accordingly, a simpler and more wear-resistant as well as easily guardable type of linkage connection can be used which, in addition, is less highly stressed and less endangered by dirt accumulation or physical damage than the fork-shaped one which is attached according to the state of the art in the center of the actuator. Unsprung sliding motions of the pins also take place in the slot-shaped openings which are difficult to cover.

Thus, the invention provides a steering arrangement, particularly for narrow-gage motor vehicles, with an axle housing (2) journaled by means of a pivot bearing pivot (6) in a vehicle frame. Steering knuckle bearings (18) are provided at an end of the axle housing upon which a wheel hub or a wheel hub drive (17) is attached in a pivoting manner. A pair of steering lever bearings (16) receive the ends of a pair of piston rods. The rods, which serve as longitudinally stiff tie rods, can be driven, depending on the direction of activation, by a double-acting actuator (5) pivotable in the steering lever bearings (16) with respect to the axle housing (2). The actuator is linked to the axle housing (2) via a linkage connection (4) which comprises a connecting lever (7). Importantly, the connecting linkage (4) is positioned to the side of the pivot bearing pivot (6) and away from the center of the actuator (5). The connecting linkage is also linked to one of the ends of the actuator with limited but angularly universally movable articulation.

The steering arrangement may have a type of linkage connection in which the connecting lever with one of its articulations can be guided precisely on a pivot on the axle tube. Thus, linkage connection (4) can exhibit two articulations (7, 8, 9, 10) and for which one articulation (7, 8) only renders possible a horizontal rotation of the connecting lever (7) with respect to the piston rod (15).

Furthermore, the steering arrangement may employ a simple commercial ball-and-socket link and thereby also a coupling insensitive to vibration and easily sealable. Thus, a ball joint (9, 10) is provided in linkage connection (4), whose ball stud (10) is fastened to the actuator (5).

Moreover, the steering arrangement permits a steering geometry particularly advantageous for large steering angle excursions. To achieve this, there is a steering knuckle bearing (18) which exhibits camber as well as caster.

The camber is preferably selected in a range from 6° to 10°, and the caster in the range from 3° to 9°. This is the preferred steering geometry criteria for large steering angle excursions with good steering stability and very small relative motions of the links for steering arrangements in the sense of the invention.

According to another aspect of the invention, the linkage connection of the connecting lever (7) is conducted in a rubber-metal connection (24). This arrangement permits a compensation, particularly free of binding effects of axle offset, all resulting from the compact arrangement.

In a final aspect of the invention, only one ball joint is provided with a ball stud (10) limitedly movable as to height and supported by elastic means, and wherein the ball socket (9) also terminates in a connecting lever (7) implemented as a threaded bolt which is rigidly fastened to actuator (5) via a strap. This feature demonstrates the sufficiency of a single specially shaped ball joint to provide a small height displacement of the ball.

BRIEF DESCRIPTION OF THE DRAWING

The invention is described in more detail by means of drawings of a preferred example or implementation:

FIG. 4 shows a front view of the linkage connection mounted on the axle housing, and its connection on the actuator via two links.

FIG. 5 shows the top view thereto.

FIG. 6 shows the side view thereto.

FIG. 7 shows thereto a variation of the rotary link on the axle housing executed as a metal-rubber combination.

FIG. 8 shows a variation which permits a small axial mobility of the ball stud in the ball socket.

FIG. 9 shows a top view thereto.

DETAILED DESCRIPTION OF THE INVENTION

Figure 1:
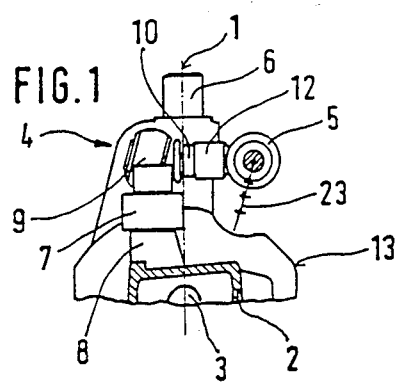
FIG. 1 shows a partial section of the axle with linkage connection, actuator and pivot bearing as well as a sketch of a change in position of the center of the actuator for various steering angle excursions

In FIG. 1 the steering is shown in section and depicts the vehicle longitudinal axis in a vertical position. The linkage connection 4 to the actuator protrudes from the axle tube 2 which surrounds drive shaft 3 points downwards. Connection 4, in normal position, protrudes from the axle tube 2 towards the rear, and in special cases towards the front.

In this illustration, the pivot 6 of the pivot bearing can be seen to the rear of linkage connection 4. The linkage connection 4 consists here of a connecting lever 7 oriented parallel to the vehicle axis 1, operating as a pivoting lever on boss 8, which via a ball stud 10 with a stud end 11 retained therein, which ball stud is screwed into threaded sleeve 12 extending at right angles upwards from the axle housing (or, here, to the left respectively), exhibits limited angularly movable articulation on actuator 5, and makes it possible to follow the curved path of the actuator 5 due to steering excursions.

It can be seen clearly that the linkage connection 4 is made sufficiently short that it is possible to place actuator 5 closely below the pivot 6 of the pivot bearing, but still above the lower outline of the axle housing 13. The housing is enlarged in the center for the differential, thus protected from damage, where the axial distance from axle housing 2 and actuator 5 becomes less than the axial overhang of pivot 6 of the pivot bearing.

Figure 2:
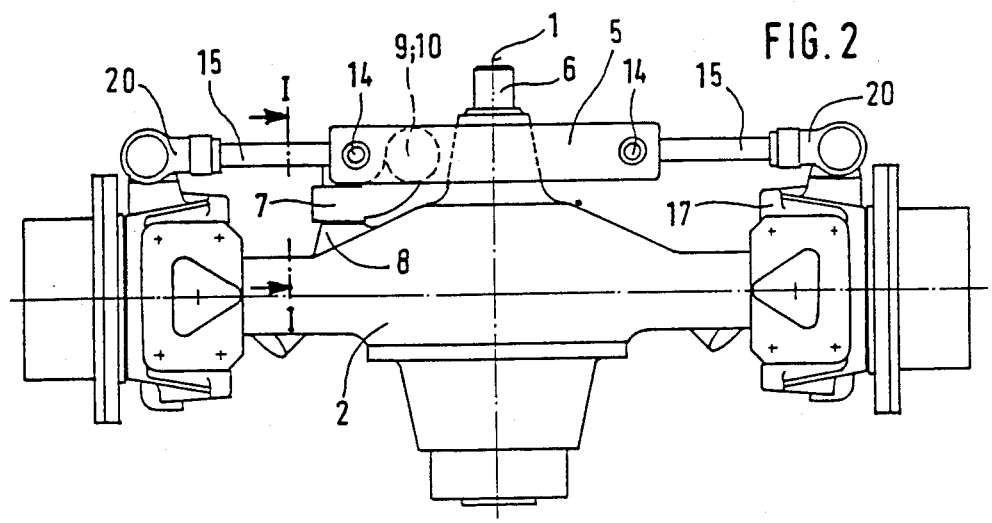
FIG. 2 shows a top view of the entire steering arrangement in the straight-ahead position.

In FIG. 2 the axle housing boss 8 for the attachment of the linkage connection 4 on axle housing 2 is laterally offset to the side of pivot 6 of the pivot bearing, visible approximately where the taper of the axle housing 2 is reached and where one of the ends of actuator 5 comes to lie, and to which linkage connection 4 is attached at a significant distance from the actuator's center, approximately opposite one of the oil pressure connections 14.

The actuator 5 bears against steering lever bearings 16 via the two piston rods 15 issuing on both sides with longitudinal stiffness which here also fill the function of the tie rod. These steering lever bearings are incorporated, one each, into wheel hub drives 17, having a steering knuckle bearing 18 (not shown separately), about which the wheel hub drives 17 are capable of being pivoted by means of actuator 5. In addition, the piston rods 15 are equipped with rod ends 20 which are adjustable by means of toe-in adjustments 19. The rod ends are journaled in steering lever bearings 16 in such manner that camber and caster adjustments, if provided on steering knuckle bearing 18, do not cause binding, and that even at extreme steering angle excursion in the order of magnitude of 50° no collision occurs of the piston rods 15 with the corresponding wheel hub drives 17.

Figure 3:
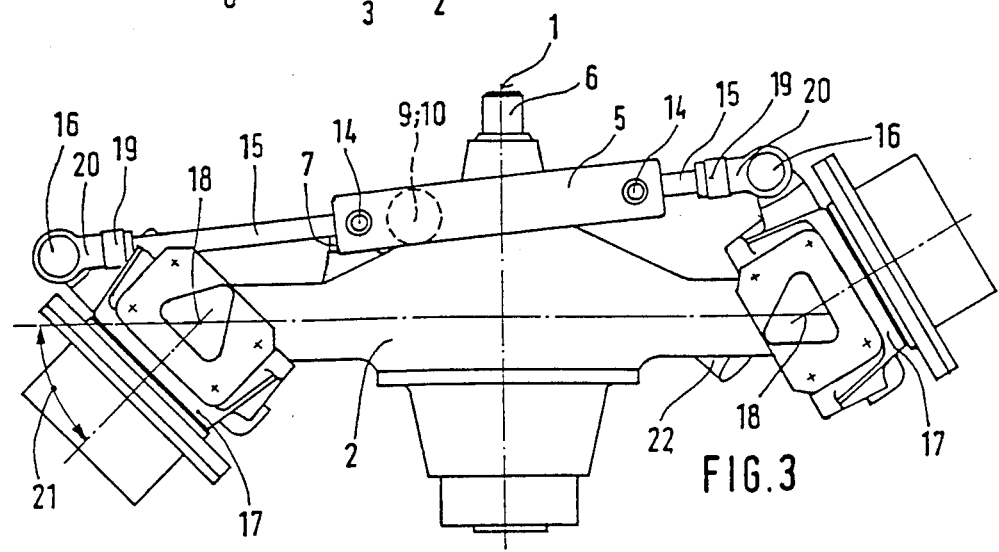
FIG. 3 shows the same top view at maximum steering angle excursion.

In FIG. 3 is shown the maximal steering angle 21. Thereby an undesired overtravel would be prevented by contact of the wheel hub drive 17 with the end stops 22 cast into axis housing 2. On the side opposite pivot bearing 6 of axle housing 2, the latter is shaped for swivel-motion journaling in the transmission housing (not shown), with simultaneous introduction of the drive shaft for the differential.

FIG. 4 shows, in graphically simplified manner, the rotary connection of lever 7 on axle housing boss 8 in front view and actuator 5 in side view and cross section. The distance of the boss 8 from the longitudinal axis of the vehicle in which the pivot 6 of pivot bearing is also located, amounts here to about twice the length of lever 7. Pivot 6 protrudes nowhere beyond the profile of the axle housing 2 and makes it possible to definitely place actuator 5 by about the dimension of its diameter above the horizontal axis of axle housing 2, protected from ground contact, without thereby vertically going beyond axle housing 2. It is only necessary to provide sealing caps 24 which seal rotationally.

In FIG. 5 is shown the rotational connection in axle housing boss 8 in section and the ball joint 9, 10 in top view. Lever 7 has here a curvature by means of which the ball joint 9, 10 is held from axle housing 2 in sufficient distance from actuator 5.

In FIG. 6 is shown the side view and the compact arrangement of actuator 5 to the rear of the swivel bearing suspension 6 of the axle housing 2 and the tilt motion, which the ball stud executes upon actuation of actuator 5 in direction toward axle housing 2.

During a left-hand curve, the center of actuator 5 moves in an upper curved path, and during a right-hand curve in a lower one. Straight-line motion is only possible with a central arrangement. The space advantages of a non-central arrangement of the linkage becomes only possible when the known linkage with straight-line guidance is replaced, in the sense of the invention, by a linkage connection 4, which permits curved paths for the actuator 5 and can be built compactly.

In FIG. 7 can be seen in partial section through lever 7 or the axle housing boss 8 a rubber-to-metal support 27, by which, depending on the steering geometry rotational capability of lever 7 with respect to boss 8 can be done away with.

In FIGS. 8 and 9 an implementation of socket bearing 9, 10 is shown in section and top view, where the ball stud 10 is afforded limited axial motion in a sliding bearing element 25 against an elastic support 26, and movability on boss 8 is not required. Thereby, in lieu of a threaded sleeve 12, the ball stud 10 is fastened via a conical threaded fastening to a strap 28 which is welded to actuator 5.

The operation of the steering arrangement differs from the state of the art in essence in the fact that upon actuation of actuator 5 or a change of its central position between steering lever bearings 16 there occurs a rotation of the actuator 5 about ball socket 9 located outside the longitudinal vehicle axis, and simultaneously about the rotary joint of lever 7 of linkage connection 4, because the axis of actuator 5 approaches axle housing 2 on a curved path 23 inclined somewhat toward the axis of drive shaft 3 due to rotation of lever 7 and ball stud 10 incidental to increasing steering excursion.

At the two centers of rotation 8 and 9 of the connecting linkage, only rotary relative motions will thereby arise. It will therefore be easy to seal the bearing points in question against dirt by means of the usual sealing caps 24. There exists also the possibility to limit the relative motion of one of the articulations, e.g. by the selection of certain caster and camber angles at the steering knuckle bearing, in such manner that, e.g. for light vehicles, only one ball joint 9, 10 is necessary with a ball axially slidable up and down in an elastic ball support 26, or that in addition to the rotary articulation 7, 8, a rubber-to-metal connection 27 will suffice.

We claim:

1. Steering arrangement for motor vehicles comprising:
    a vehicle frame;
    an axle housing journaled by means of a pivot bearing pivot in said frame;
    a pair of steering knuckle bearings, each being connected to an end of said axle housing;
    a wheel hub or a wheel hub drive attached in a pivoting manner to each of said steering knuckle bearings;
    at least one piston rod to serve as a longitudinally stiff tie rod;
    a pair of steering lever bearings each receiving an end of said piston rod;
    a double-acting actuator driving said piston rods, depending upon the direction of activation, pivotable in said steering lever bearings with respect to said axle housing, said actuator being linked to said axle housing via a linkage connection comprising a connecting lever;
    said linkage connection positioned to the side of said pivot bearing pivot, away from the center of said actuator, and further linked to an end of said actuator with limited but angularly universally movable articulation;
    said linkage connection exhibiting two articulations of which one articulation only makes possible a horizontal rotation of said connecting lever with respect to said piston rod, said one articulation being fastened between an end of said connecting lever and said axle housing; and
    a ball joint being provided in said linkage connection whose ball stud is fastened to said actuator.

2. Arrangement according to claim 1, characterized by the fact that the steering knuckle bearing exhibits camber as well as caster.

3. Arrangement according to claim 2, characterized by the fact that the camber is selected in the range from 6° to 10°, and the caster in the range from 3° to 9°.

4. Arrangement according to claim 1, characterized by the fact that the linkage connection of the connecting lever is conducted in a rubber-metal connection.

5. Arrangement according to claim 1, characterized by the fact that only one ball joint is provided with a ball stud limitedly movable as to height and supported by elastic means, and that ball socket also terminates in a connecting lever implemented as a threaded bolt which is rigidly fastened to actuator via a strap.

6. Arrangement according to claim 1 wherein said actuator is positioned closely below said pivot but still above a lower outline of said axle housing.

* * * * *